US006612479B2

(12) United States Patent
Popoola et al.

(10) Patent No.: US 6,612,479 B2
(45) Date of Patent: Sep. 2, 2003

(54) APPARATUS AND METHOD FOR JOINING LAYERS OF MATERIALS

(75) Inventors: Oludele Olusegun Popoola, Novi, MI (US); Daniel Edward Wilkosz, Ypsilanti, MI (US); Larry Van Reatherford, Clarkston, MI (US); Jan Birger Skogsmo, Canton, MI (US); Robert Koehl, Canton, MI (US); Ronald P. Cooper, Eastpointe, MI (US); Arnon Wexler, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 09/682,728

(22) Filed: Oct. 10, 2001

(65) Prior Publication Data

US 2003/0066862 A1 Apr. 10, 2003

(51) Int. Cl.⁷ .......................... B23K 1/06; B23K 37/00; B23K 1/00
(52) U.S. Cl. ...................... 228/110.1; 228/1.1; 228/4.1; 228/6.1; 228/110.1; 228/190; 228/213
(58) Field of Search .............................. 228/110.1, 177, 228/178, 182, 190, 212, 213, 1.1, 4.1, 6.1, 24, 44.3; 156/73.1, 73.2, 580.1

(56) References Cited

U.S. PATENT DOCUMENTS

| 3,039,333 | A |   | 6/1962  | Jones et al. |
| 3,291,957 | A |   | 12/1966 | Bodine |
| 3,438,428 | A |   | 4/1969  | Balamuth et al. |
| 3,529,660 | A |   | 9/1970  | Obeda |
| 3,750,926 | A |   | 8/1973  | Sakamoto et al. |
| 4,194,937 | A |   | 3/1980  | Hashmall |
| 4,333,978 | A | * | 6/1982  | Kocher ........................ 428/158 |
| 4,527,727 | A |   | 7/1985  | Renshaw |
| 4,529,115 | A |   | 7/1985  | Renshaw et al. |
| 4,545,519 | A |   | 10/1985 | Renshaw et al. |
| 4,572,753 | A |   | 2/1986  | Bach |
| 4,647,325 | A |   | 3/1987  | Bach |
| 4,758,293 | A | * | 7/1988  | Samida ........................ 156/73.1 |
| 4,798,639 | A |   | 1/1989  | Yamaguchi |
| 4,867,370 | A |   | 9/1989  | Welter et al. |
| 5,147,082 | A |   | 9/1992  | Krause et al. |
| 5,575,884 | A |   | 11/1996 | Annehed et al. |
| 5,651,494 | A |   | 7/1997  | Ogino et al. |
| 5,709,823 | A |   | 1/1998  | Hahn |
| 5,782,575 | A |   | 7/1998  | Vincent et al. |
| 5,785,786 | A |   | 7/1998  | Suzuki et al. |
| 5,800,672 | A |   | 9/1998  | Boyce et al. |
| 5,921,457 | A |   | 7/1999  | Patrikios |
| 6,089,438 | A |   | 7/2000  | Suzuki et al. |
| 6,099,364 | A |   | 8/2000  | Shinchi |
| 6,148,515 | A |   | 11/2000 | Suzuki et al. |
| 6,176,953 | B1|   | 1/2001  | Landreth et al. |
| 6,202,915 | B1|   | 3/2001  | Sato |
| 6,238,503 | B1|   | 5/2001  | Kakehi |
| 6,499,647 | B1| * | 12/2002 | Martin ........................ 228/110.1 |

FOREIGN PATENT DOCUMENTS

| DE | 1248892       | 10/1971 |
| DE | 27 26 137 A1  | 12/1978 |
| DE | 41 01 545 A1  | 7/1992  |
| DE | 197 49 682 A1 | 5/1999  |
| DE | 200 22 186 U1 | 4/2001  |
| GB | 884306        | 12/1961 |
| GB | 2 285 943 A   | 1/1995  |
| GB | 2 370 806 A   | 7/2002  |
| JP | 60201928      | 12/1985 |
| JP | 63140784      | 6/1988  |
| JP | 10244381      | 9/1998  |
| JP | 2000301356    | 10/2000 |
| WO | WO 93/21000   | 10/1993 |
| WO | WO 98/41095   | 9/1998  |

OTHER PUBLICATIONS

European Search Report 02102335.
European Search Report 02102336.

* cited by examiner

*Primary Examiner*—Tom Dunn
*Assistant Examiner*—Zidia T. Pittman
(74) *Attorney, Agent, or Firm*—Raymond L. Coppiellie

(57) ABSTRACT

A method and apparatus for joining multiple layers of materials using an ultrasonic welding apparatus. The ultrasonic welding apparatus utilizes a sonotrode to perform a weld between at least the top and intermediate layer of the multi-layer member. Then, either the multi-layer member or the ultrasonic welding apparatus is rotated such that the bottom layer is positioned adjacent the sonotrode wherein the sonotrode forms a weld between at least the bottom layer and intermediate layer of the multi-layer member. The apparatus includes an ultrasonic welding gun having a C-shape frame including a base portion and a head portion. An ultrasonic welding device, including a sonotrode, is secured to the head portion and an anvil secured to the base portion. The ultrasonic welding gun is connected to a robot operative to position the ultrasonic welding gun to perform the welding operation.

8 Claims, 5 Drawing Sheets

APPARATUS AND METHOD FOR JOINING LAYERS OF MATERIALS

BACKGROUND OF INVENTION

The present invention relates generally to ultrasonic welding and more particularly to welding at least two layers of material together.

Ultrasonic welding of dissimilar materials is known. In today's manufacturing society, lightweight composite materials are desirable and often substituted in an attempt to build lighter and stronger products. Such manufacturing often requires the joining of several layers of lightweight materials formed of various combinations and alloys, such as aluminum and magnesium. In a typical automotive application, the two aluminum layers sandwich a magnesium layer between them. These layers must be connected to one another or, put succinctly, welded together to form a single unitary component.

As known with ultrasonic welding, the strength and degree of weld penetration decreases the further the distance from the sonotrode tip. Accordingly, when welding multiple layers of material the weld lessens in strength at the subsequent or lower interfaces; i.e., the weld at the interfaces between the lower layers is not as strong as the weld at the interface between the top and immediately adjacent layer.

SUMMARY OF INVENTION

Accordingly, the present invention is an ultrasonic welding apparatus and method for joining layers of materials. The method includes the steps of clamping multiple layers of materials between a sonotrode and an anvil of an ultrasonic welding apparatus. Once clamped, the ultrasonic welding apparatus, specifically the sonotrode, forms a weld between at least the top and intermediate layer of the multi-layer member, wherein the first or top layer is adjacent the sonotrode. Then, rotating either the multi-layer member or the ultrasonic welding apparatus wherein the bottom layer of the multi-layer member is now positioned adjacent the sonotrode. Once the sonotrode is positioned adjacent the bottom or lower layer, the layers are once again clamped and a weld is formed between at least the bottom and intermediate layer.

In an additional embodiment, the intermediate layer may include a plurality of layers. In some instances, additional layers are placed on and overlay the outer layers of the multi-layer member. These layers are also ultrasonically welded thereto. This process results in an ultrasonically welded multi-layer composite member.

The ultrasonic welding assembly includes an ultrasonic welding gun having a C-shape frame including a base portion and a head portion joined together to form the C-shape frame. The C-shape frame further defining a throat area between the base portion and head portion. An ultrasonic welding device, including a sonotrode is secured to the head portion. Secured to the base portion is an anvil. The ultrasonic welding assembly further includes a robot connected to the ultrasonic welding gun. The robot operates to position and rotate the ultrasonic welding gun to perform the welding operation.

In a further embodiment, an additional ultrasonic welding device replaces the anvil of the ultrasonic welding gun positioned on the base portion. Accordingly, the ultrasonic welding gun welds from either side of the multi-layer member without removing and rotating either the multi-layer member or the ultrasonic welding gun.

In an additional embodiment, the anvil and sonotrode assembly are positioned on separate supports or frames. Accordingly, both the anvil and sonotrode move independently to a specific location to perform a welding operation rather than moving the multi-layer member.

DETAILED DESCRIPTION

Figure 1:
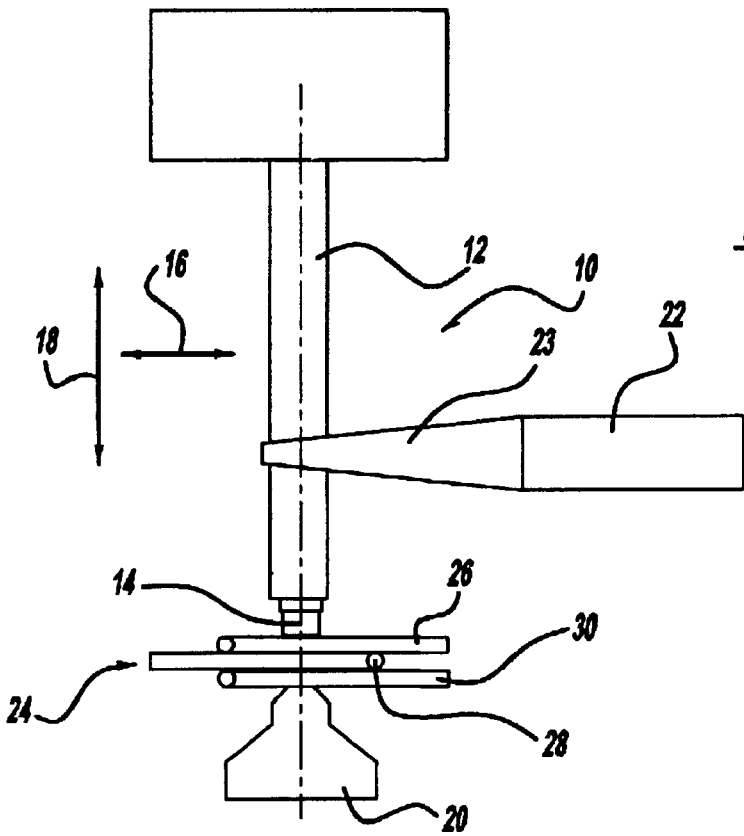
FIG. 1 is a schematic view of an ultrasonic welding apparatus that can be used with the method of the present invention.

FIG. 1 shows an ultrasonic welding apparatus 10 for use in accordance with the method of the present invention. The ultrasonic welding apparatus 10 includes a reed 12 and sonotrode 14 mounted thereon for movement in a side-to-side or horizontal direction of vibration, shown by the arrow 16. The reed 12 with the mounted sonotrode 14 also moves in a vertical manner, shown by the arrow 18, and in cooperation with an anvil 20 clamps multiple layers of material together prior to welding the layers together to form a multi-layer member 24. As used herein, the term sonotrode generally refers to the tool attached to the reed 12. In many cases, the sonotrode 14 also includes replaceable tip. Accordingly, the sonotrode 14 is the gripping tool attached to the end of the reed 12. A transducer 22 operates through a wedge 23 that transfers the vibrations from the transducer 22 to the reed 12.

Figure 2:
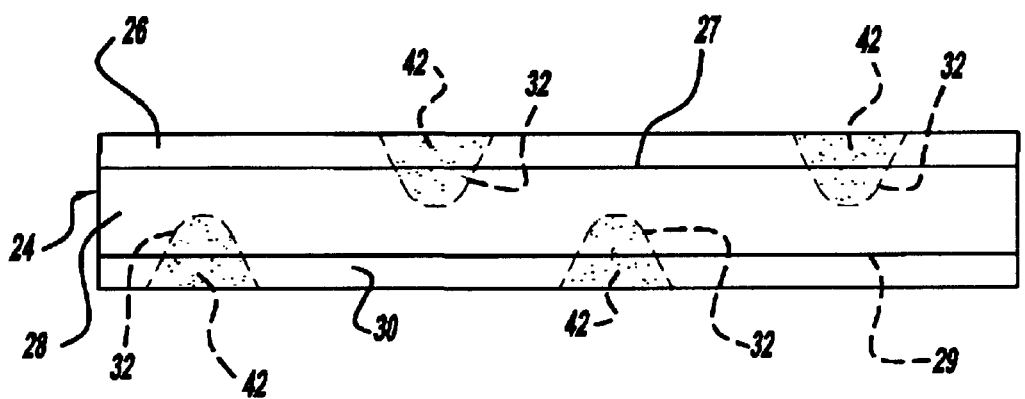
FIG. 2 is a schematic view illustrating a multi-layer workpiece formed of multiple layers of material welded together in accordance with the method of the present invention.

As shown in FIG. 2, in one embodiment the multi-layer member 24 includes a top or upper layer 26, an inner layer 28, and a bottom or lower layer 30. Once the multi-layer member 24 is clamped, a transducer 22 vibrates the reed 12 at a high frequency to impart energy to the multi-layer member 24 at a location between the sonotrode 14 and anvil 20. Positioning the sonotrode 14 adjacent the top or upper layer 26 causes the energy from the vibrating sonotrode to form a bond or weld 32 at at least the interface 27 between the top or upper layer 26 and the inner layer 28 in accordance with known ultrasonic welding processes.

The invention includes a method for joining multiple layers of material utilizing a stitch-weld technique that forms successive welds 32 between the top or upper layer 26 or the bottom or lower layer 30 and the inner layer 28 by applying ultrasonic vibrations to each side of the multi-layer member 24. In one embodiment, typically used for an automotive application, a three-layer combination of aluminum and magnesium layers forms the multi-layer member 24. Wherein magnesium forms the inner layer 28 that is sandwiched between the top 26 and bottom 30 layers formed of aluminum. As illustrated in FIG. 2, successive welds 32 are formed between the inner 28 magnesium layer and the top and bottom 26, 30 aluminum layers.

In one embodiment, physically rotating or turning over either the multi-layer member 24 or the ultrasonic welding apparatus 10 accomplishes the stitch welding process. Specifically the method includes the steps of clamping the respective inner 28 and outer 26, 30 layers of the multi-layer member 24 between the sonotrode 14 and the anvil 20. As depicted in FIG. 1, the top or upper layer 26 is placed adjacent to and contacts the sonotrode 14 when the multi-layer member 24 is clamped within the ultrasonic welding apparatus 10. The sonotrode 14 than vibrates to transfer ultrasonic energy to the multi-layer member 24 to form a weld 32 primarily between the top or upper layer 26, in contact with the sonotrode 14 and the inner layer 28.

Upon completion of the welding process, the ultrasonic welding apparatus is unclamped and either the multi-layer member 24 or the ultrasonic welding apparatus 10 is rotated or turned over such that the lower or bottom layer 30 is adjacent to the sonotrode 14. The ultrasonic welding apparatus closes once again to clamp the multi-layer member 24 between the sonotrode 14 and the anvil 20. Once clamped, the sonotrode 14, in contact with the bottom or lower layer 30, vibrates to transfer ultrasonic energy to form a weld 32 primarily between the bottom or lower layer 30 and the inner layer 28.

Accordingly, welds 32 applied from alternating sides of the multi-layer member 24 join all three layers of the multi-layer member 24. As shown in FIG. 2, the welds 32 are laterally offset from one another. FIG. 2 shows the weld zone 42 formed primarily between either the top or upper layer 26 or the bottom or lower layer 30 and the inner layer 28. It is known to one of skill in the art, however, that the weld zone 42, depending upon the amount of vibrational energy transferred from the sonotrode 14 to the individual layers, may extend or penetrate from the top or upper layer 26 through the inner layer 28 and form an additional weld at the interface 29 between the inner layer 28 and the bottom or lower layer 30. Increasing the penetration depth of the weld 32 typically results in an increase in the strength of the multi-layer member 24 as the weld 32 extends through both interfaces 27,29 of the top and bottom layers 26, 30 and the inner layer 28.

Additionally, the present invention contemplates welding more than three layers with the above-identified method. This is accomplished in one of several ways, one of which includes generating sufficient ultrasonic energy such that a weld is formed between and penetrates through multiple layers of the multi-layer member 24. For instance, in a four-layer assembly, the weld 32 extends or penetrates through the first and second layers and into the third layer to join the first, second and third layers at the interfaces between the first and second layer and the second and third layer. Accordingly, as set forth above, once the welding process is completed either the multi-layer member 24 or the ultrasonic welding apparatus rotates. After which, a weld 32 is formed that extends from the fourth layer through the third and second layers again forming a weld at the interfaces between the fourth and third layer and the third and second layer.

Pursuant to the invention, additional layers may be added by placing them on the already welded layers. For instance, starting with a three-layer multi-layer member a fourth and fifth layer may be welded thereto. Accordingly, a plurality of layers of similar or dissimilar materials may be welded together to form a composite multi-layer member.

A further aspect of the inventive method includes the use of two oppositely facing sonotrodes, each operative to form a weld. As set forth more fully below, each sonotrode serves as an anvil for the opposite sonotrode depending upon which sonotrode is vibrating to impart vibrational energy to the multi-layer member to form a weld. In accordance with the inventive method, the two sonotrodes clamp the multiple layers between them. Initially, one of the sonotrodes vibrates while the other sonotrode remains stationary and acts as an anvil in order to form a weld between the top or upper layer, adjacent to the sonotrode, and the inner layer. Upon completion of the initial welding process, the first sonotrode remains stationary, while the opposite sonotrode vibrates to form a weld between the bottom layer, adjacent the opposite or second sonotrode, and the inner layer.

Accordingly, welds applied from alternating sides join the three layers of the multi-layer member. Prior to forming the second weld, as set forth above, the sonotrodes may be unclamped from the multi-layer member and repositioned such that the second weld is laterally offset from the first weld.

Figure 3:
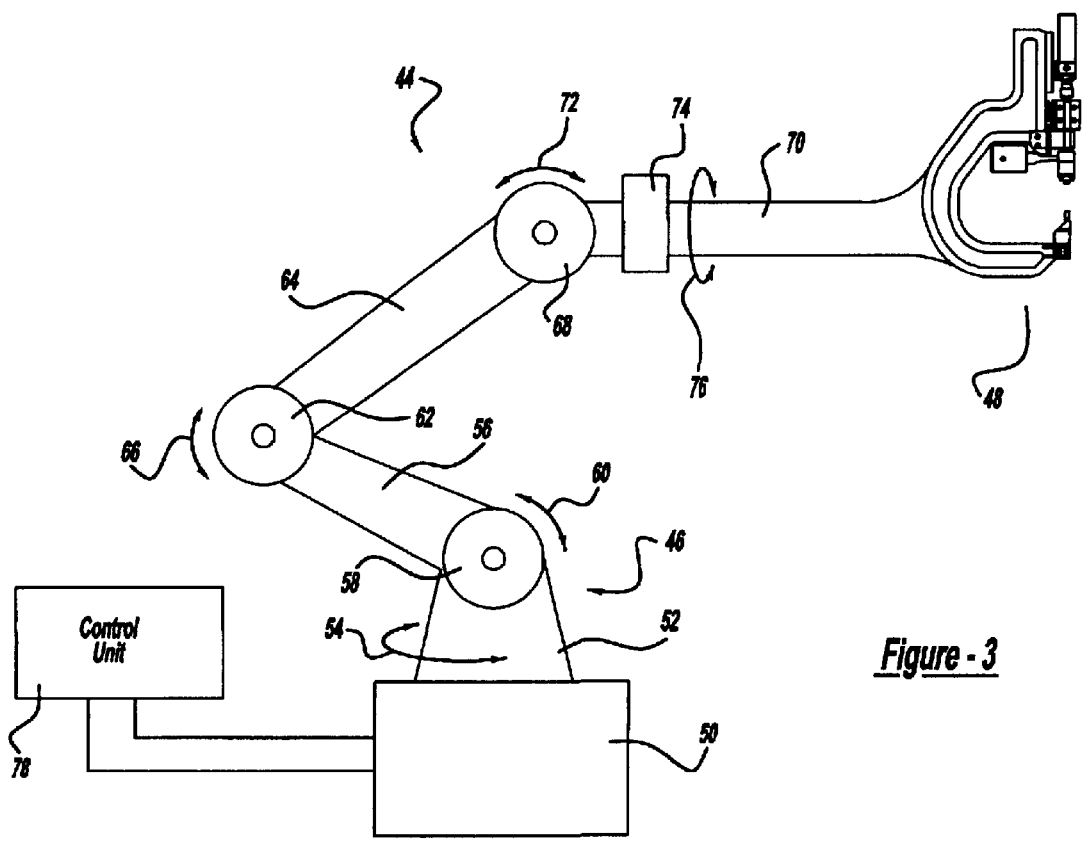
FIG. 3 is a schematic view of a robot attached to and operative to move and position an ultrasonic welding gun.

Depicted in FIG. 3 is an embodiment of an ultrasonic welding assembly 44 for use with a method of the present invention. The ultrasonic welding assembly 44 includes a robot, seen generally at 46, supporting an ultrasonic welding gun 48. A base 50 that includes a movable member 52 rotatably supported on the base 50 supports the robot 46 for movement in the direction indicated by the arrow 54. A first arm 56 is pivotally connected to the movable member 52 at a first pivot joint 58 for movement in the direction indicated by the arrow 60. A second pivot joint 62 connects the first arm 56 with a second arm 64 and enables movement in the direction indicated by the arrow 66. A third pivot joint 68 connects a third arm 70 to the second arm 64 and enables movement in the direction indicated by the arrow 72. A rotation joint 74 disposed on the third arm 70 enables rotation of the member a fourth and fifth layer may be welded thereto. Accordingly, a plurality of layers of similar or dissimilar materials may be welded together to form a composite multi-layer member.

A further aspect of the inventive method includes the use of two oppositely facing sonotrodes, each operative to form a weld. As set forth more fully below, each sonotrode serves as an anvil for the opposite sonotrode depending upon which sonotrode is vibrating to impart vibrational energy to the multi-layer member to form a weld. In accordance with the inventive method, the two sonotrodes clamp the multiple layers between them. Initially, one of the sonotrodes vibrates while the other sonotrode remains stationary and acts as an anvil in order to form a weld between the top or upper layer, adjacent to the sonotrode, and the inner layer. Upon completion of the initial welding process, the first sonotrode remains stationary, while the opposite sonotrode vibrates to form a weld between the bottom layer, adjacent the opposite or second sonotrode, and the inner layer.

Accordingly, welds applied from alternating sides join the three layers of the multi-layer member. Prior to forming the second weld, as set forth above, the sonotrodes may be unclamped from the multi-layer member and repositioned such that the second weld is laterally offset from the first weld.

Depicted in FIG. 3 is an embodiment of an ultrasonic welding assembly 44 for use with a method of the present invention. The ultrasonic welding assembly 44 includes a robot, seen generally at 46, supporting an ultrasonic welding gun 48. A base 50 that includes a movable member 52 rotatably supported on the base 50 supports the robot 46 for movement in the direction indicated by the arrow 54. A first arm 56 is pivotally connected to the movable member 52 at a first pivot joint 58 for movement in the direction indicated by the arrow 60. A second pivot joint 62 connects the first arm 56 with a second arm 64 and enables movement in the direction indicated by the arrow 66. A third pivot joint 68 connects a third arm 70 to the second arm 64 and enables movement in the direction indicated by the arrow 72. A rotation joint 74 disposed on the third arm 70 enables rotation of the third arm 70 about the longitudinal axis of the third arm 70 in the direction shown by the arrow 76.

A control unit 78, including a processing unit for receiving and sending control information, operates to position the ultrasonic welding gun 48 to perform the welding operation. The control unit 78 also controls operation of the ultrasonic welding gun 48. Accordingly, the ultrasonic welding assembly 44 is programmable to perform a variety of welding tasks in various positions on various types of materials.

Figure 4:
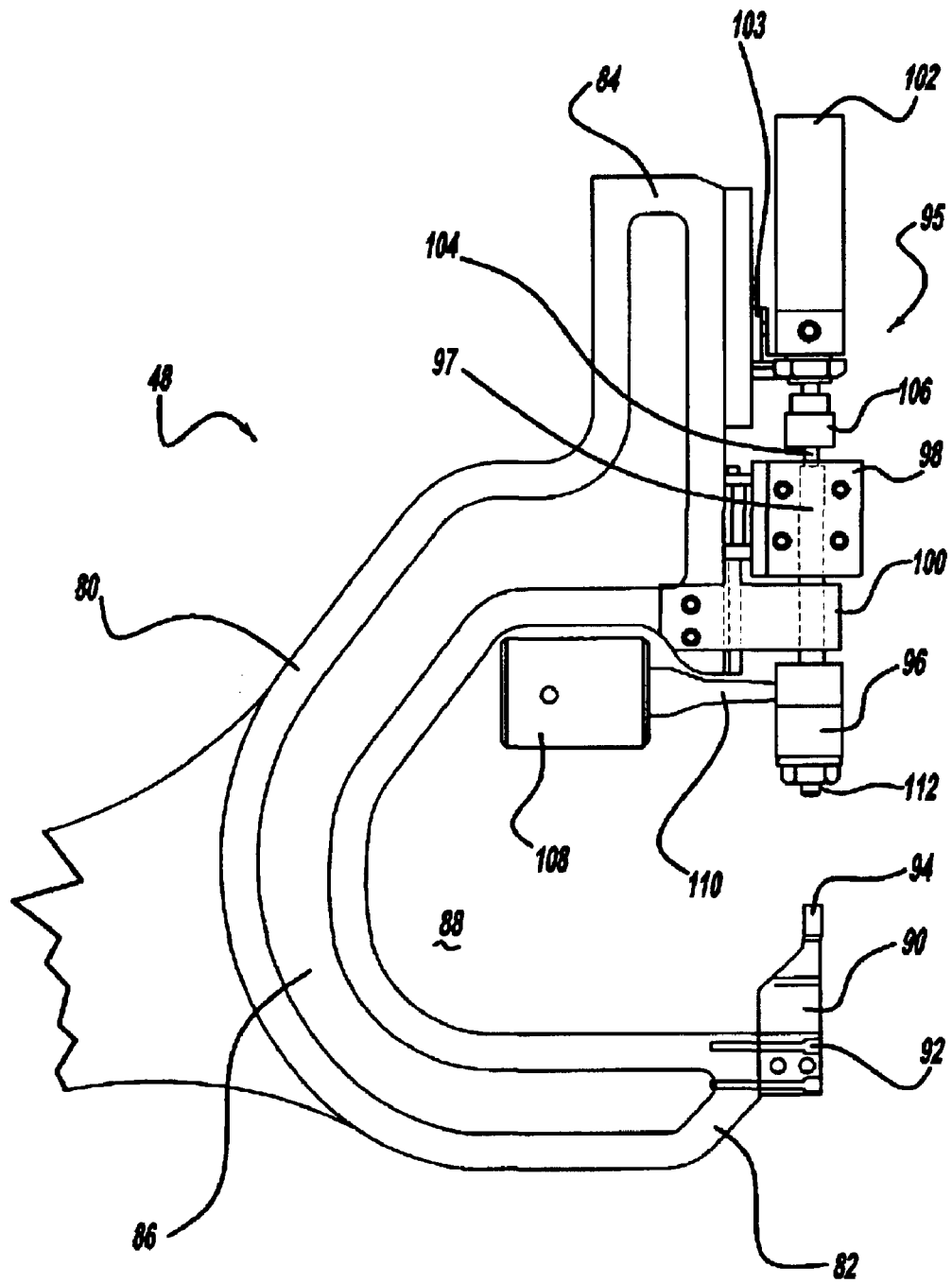
FIG. 4 is an enlarged side view of the ultrasonic welding gun of FIG. 3.

Turning now to FIG. 4, there is shown the ultrasonic welding gun 48 in greater detail. As shown, the ultrasonic welding gun 48 has a C-shape frame 80 including a base portion 82 and a head portion 84 interconnected by a column portion 86. The C-shape frame defines a throat 88 into which the multiple layers are inserted. The depth of the throat 88 limits the location of the welds on the multi-layer member. For example, a deeper throat 88 enables welding the multi-layer member at a greater the distance from the peripheral edge thereof.

An anvil 90 is secured on the C-shape frame 80 via threaded fasteners 92. The anvil 90 may also form an integral part of the base portion 82 wherein only the tip portion 94 of the anvil 90 is removably secured to the base portion 82.

Mounted for reciprocal movement on the head portion 84 of the C-shape frame 80 is an ultrasonic welding device 95, including a sonotrode 112 mounted to a reed 96. In the present instance, the reed 96 is slidably secured within a guide or support bracket 98 secured to the head portion 84. A reed support 100 further supports and guides the upper end 97 of the reed 96. A cylinder support bracket 103 supports a clamp cylinder 102, either hydraulic or pneumatic type, on the head portion 84. In addition, other types of drive mechanisms such as lead screws or servos may also be used. A coupling 106 connects a rod member 104 of the clamp cylinder 102 to the upper end 97 of the reed 96. In operation, the clamp cylinder 102 urges the sonotrode 96 inward toward the anvil 90 to clamp the multiple layers between the anvil 90 and sonotrode 96. Once clamped, a transducer 108 vibrates a wedge 110 connected to the reed 96 to impart vibrational movement to the sonotrode tip 112 to perform the welding operation. This arrangement is similar to that shown in FIG. 1.

Figure 5:
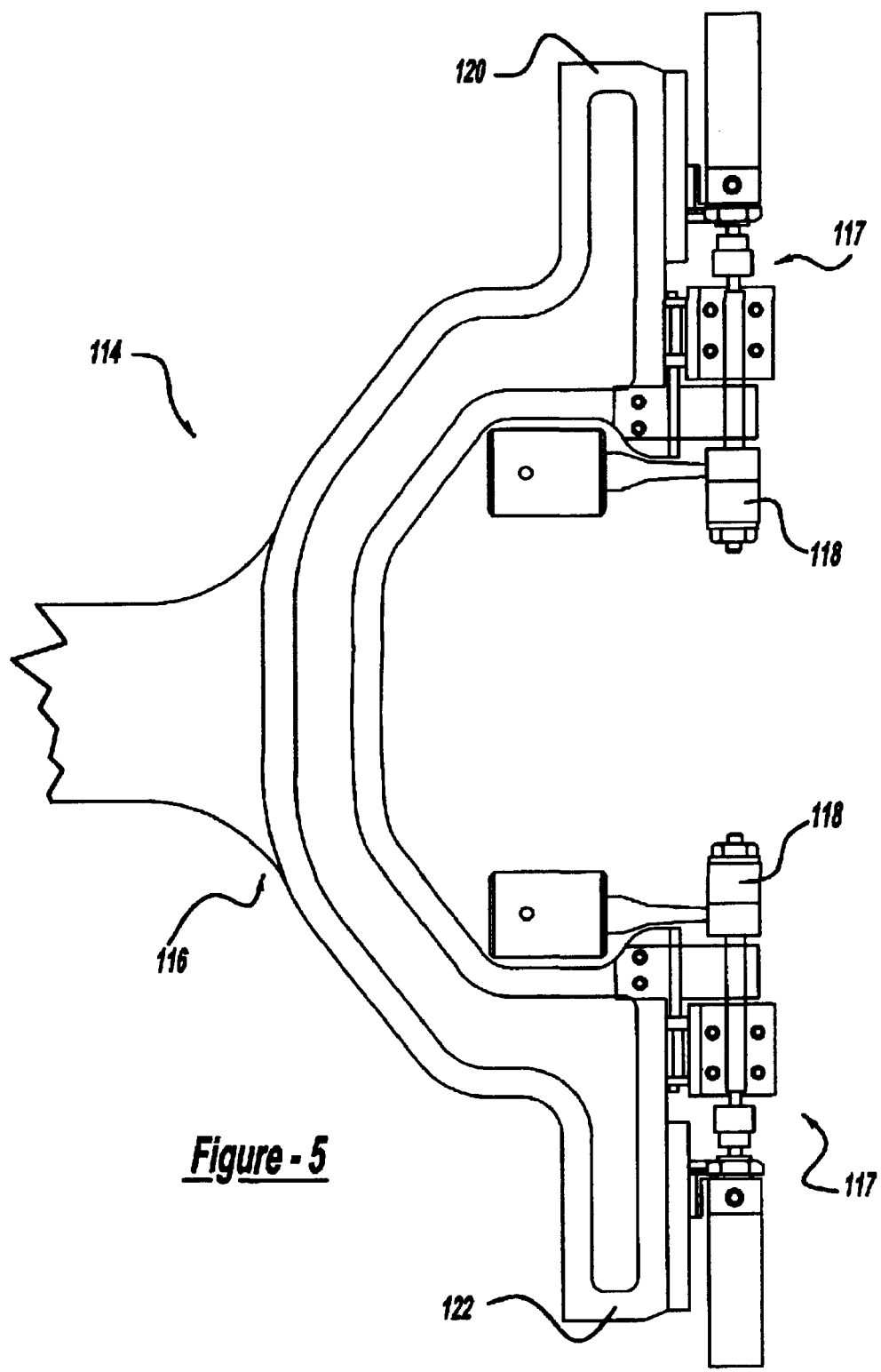
FIG. 5 is an enlarged side view of an alternative embodiment of an ultrasonic welding gun in accordance with the present invention.

Turning now to FIG. 5, there is shown an alternate embodiment of and ultrasonic welding assembly 114 for use with the method of the present invention. The ultrasonic welding assembly 114 includes a C-shape frame 116 supporting ultrasonic welding devices 117, including sonotrodes 118, mounted on both the head portion 120 and base portion 122 of the C-shape frame 116. In all other respects, the mounting arrangement and operation of the ultrasonic welding devices 117, including the sonotrodes 118, is identical to the ultrasonic welding device 95 of the previous embodiment.

In this alternative embodiment, the two sonotrodes 118 alternately serve as the anvil for the opposite sonotrode 118 during the welding process. For example, during the welding process the two sonotrodes come together to clamp the multiple layers in position for welding. One of the sonotrodes 118 remains stationary and functions as an anvil while the opposite sonotrode vibrates to form a weld. After the first sonotrode has completed the welding process, it remains stationary and the opposite sonotrode is energized to form a weld on the opposite side of the multi-layer member across from the first weld. The process can use the same power supply for both guns.

In addition, the sonotrodes may be unclamped from the multi-layer member and shifted, to a new position prior to energizing the opposite sonotrode. The sonotrodes are then re-clamped to the multi-layer member wherein the sonotrode that formed the previous weld now functions as the anvil and the sonotrode performing the function of the anvil now vibrates to form a weld. Accordingly, such a device joins multiple layers of material with welds applied from alternating sides and in various positions, including offset from those on the opposite surface, without the need to rotate either the ultrasonic welding gun or the multi-layer member.

Figure 6:
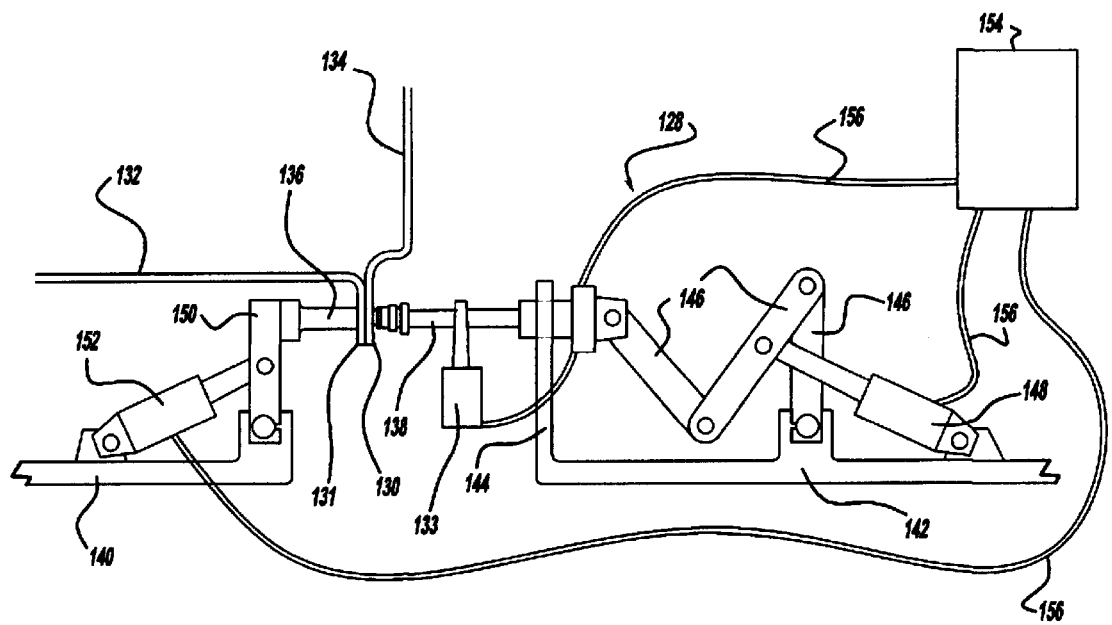
FIG. 6 is a schematic view of a further embodiment of an ultrasonic welding apparatus in accordance with the present invention.

A further embodiment of the present invention is illustrated in FIG. 6. Shown therein is a modular ultrasonic welding apparatus, seen generally at 128, for welding or forming a weld between respective flange portions 130,131 of first 132 and second 134 workpieces. The apparatus differs from the embodiments disclosed above in that the respective anvil 136 and sonotrode 138 are mounted to individual frame or support members 140, 142.

The sonotrode 138 is mounted for reciprocal movement on an upright support member 144 of the frame 142. A power cylinder 148 drives a plurality of linkage bars 146 pivotally connected to the frame 142. Accordingly, the power cylinder 148 operates to move the sonotrode 138 in a reciprocal manner on the frame 142. Thus, the sonotrode 138 moves between a disengaged position, where the sonotrode 138 is separate from the flange portion 130 and an engaged position where the sonotrode 138 contacts the flange portion 130. While shown herein utilizing linkage bars 146 and a power cylinder 148 to reciprocally move the sonotrode 138, any arrangement suitable for moving the sonotrode 138 in a reciprocal manner such that it cooperates with the anvil 136 to clamp the flange portions 130,131 prior to the welding operation is within the scope of this invention.

A linkage bar 150 pivotally mounts the anvil 136 to the frame member 140. A power cylinder 152 pivotally connected to the frame 140 connects to the linkage bar 150. The power cylinder 152 operates to move the anvil 136 between a disengaged position, wherein the anvil 136 is separated from the flange portion 131 and an engaged position wherein the anvil 136 contacts the flange portion 131 of the second workpiece 134 and supports both of the flange portions 130, 131 during the ultrasonic welding operation.

A control unit 154 connects the respective power cylinders 148, 152 and the transducer 133 through control lines 156 and operates to control operation of the modular ultrasonic welding apparatus 128. The control unit 154 may include sensors and feedback loop technology.

In accordance with the present embodiment, the first and second workpieces 132,134 are placed in a predetermined position prior to the welding operation, typically, within and supported by a fixture or jig. The anvil 136 and sonotrode 138 move to their respective engaged positions located on opposite sides of the individual flange portions 130,131. The sonotrode 138 is pressed against the flange portion 130 of the second workpiece 134 and correspondingly clamps the flange potion 130 against the opposite flange portion 131 of the first workpiece 132 supported by the anvil 136. The sonotrode 138 vibrates to produce a weld. Once the weld is completed, the anvil 136 and sonotrode 138 are retracted to their respective disengaged positions.

The ultrasonic welding assemblies shown herein utilize an anvil that supports the various workpieces during the welding operation. In some circumstances, however, the mass of the workpiece acts as the anvil thereby eliminating the need for an anvil. For instance, when welding a small or thin workpiece to any portion of a large member or frame, the mass of the member or frame may be sufficient such that only the sonotrode is used. That is, no anvil is required when the mass of the larger workpiece is sufficient to resist vibration of the sonotrode. Accordingly, the sonotrode vibrates the smaller workpiece on the larger workpiece to weld it thereto. The supporting fixture pr jig may act as an anvil and hold the bottom part or first workpiece 132 fixed.

Specifically, the sonotrode holds the smaller workpiece against the larger workpiece. Energizing the sonotrode welds the smaller workpiece to the larger workpiece. Accordingly, this eliminates the need for the anvil and enables welding of small and dissimilar parts to a larger workpiece such as an automotive frame. For instance, a ground clip or wire is easily welded to an automotive frame member despite any dissimilarity of the materials between the two pieces.

In addition, such a method and apparatus enables ultrasonic welding of pre-painted or anodized workpieces. The vibrational energy imparted to the various workpieces operates to wear or rub away the impurities from the surface of the adjacent workpieces until a metal-to-metal contact is reached. Accordingly, such ultrasonic welding enables the joinder of dissimilar or other coated materials.

Thus, the present invention provides a method for joining dissimilar workpieces such as aluminum and magnesium by ultrasonic welding utilizing a stitch-weld method forming successive welds between the inner and the outer layers. Further, the present invention also provides a method and apparatus for joining multilayers of similar materials.

It should be realized, however, that the foregoing specific embodiments have been shown and described for the purposes of illustrating the functional and structural principles of the invention and is subject to change without departure from such principles. Therefore, this invention includes all modifications encompassed within the scope of the following claims.

What is claimed is:

1. A method of joining multiple layers of materials to form a multi-layer member comprising the steps of:

placing first, second and third layers in a layered relationship;

clamping the first, second and third layers together in the layered relationship between an anvil and a sonotrode wherein the sonotrode engages the first layer;

ultrasonically welding together at least the first and second layers;

unclamping the first, second and third layers and rotating the sonotrode and the anvil such that the sonotrode is positioned adjacent the third layer and the anvil is positioned adjacent the first layer;

clamping the first, second and third layers together in the layered relationship between the anvil and the sonotrode wherein the sonotrode engages the third layer;

ultrasonically welding together at least the second and the third layers such that upon completion of the weld, the first, second and third layers form a joined together multi-layer member having welds applied from both sides of the multi-layer member.

2. A method as set forth in claim 1 including the step of alternately forming welds on opposite sides of the multi-layer member.

3. A method as set forth in claim 1 including the step of offsetting the welds applied from both sides of the multi-layer member.

4. A method as set forth in claim 1 wherein the step of ultrasonically welding the layers includes forming the weld primarily between the material of the layer in contact with the sonotrode and the material of the layer adjacent the material of the layer in contact with the sonotrode.

5. A method as set forth in claim 1 wherein the step of ultrasonically welding together at least the first and second layers includes forming the weld primarily between the first and second layers and forming at least a partial weld between the second and third layers.

6. A method as set forth in claim 5 including the step of providing additional layers and wherein the step of ultrasonically welding together at least the first and second layers includes the step of continuing to apply ultrasonic energy such that the weld progresses inward from the interface of the first and second layers to the interfaces of additional layers.

7. A method as set forth in claim 1 wherein the method includes providing additional layers wherein the weld penetrates inward from the first layer adjacent the sonotrode through each of the layers to the layer adjacent the anvil.

8. A method as set forth in claim 1 including the step of forming the weld formed on the third layer of the multi-layer member opposite the weld formed on the first layer of the multi-layer member.

* * * * *